United States Patent
Spampinato et al.

(10) Patent No.: US 7,234,348 B2
(45) Date of Patent: Jun. 26, 2007

(54) TESTING APPARATUS

(75) Inventors: Juan-Pier Antonio Spampinato, Beaverton, OR (US); Peter Ostafichuk, Vancouver (CA)

(73) Assignee: Nike, Inc., Beaverton, OR (US)

( * ) Notice: Subject to any disclaimer, the term of this patent is extended or adjusted under 35 U.S.C. 154(b) by 306 days.

(21) Appl. No.: 10/797,600

(22) Filed: Mar. 11, 2004

(65) Prior Publication Data

US 2005/0199054 A1 Sep. 15, 2005

(51) Int. Cl.
A63B 53/00 (2006.01)
(52) U.S. Cl. .................................. 73/170.01
(58) Field of Classification Search ............... 73/147, 73/170.01
See application file for complete search history.

(56) References Cited

U.S. PATENT DOCUMENTS

| | | | | |
|---|---|---|---|---|
| 3,020,754 | A * | 2/1962 | Swanson ................ | 73/147 |
| 3,306,101 | A * | 2/1967 | Holderer ................ | 73/147 |
| 4,501,214 | A * | 2/1985 | Meyer ................... | 114/39.12 |
| 4,658,635 | A | 4/1987 | Pszolla et al. | |
| 4,773,262 | A * | 9/1988 | Girard et al. .......... | 73/147 |
| 5,056,361 | A * | 10/1991 | Roberts ................. | 73/147 |
| 6,571,618 | B2 * | 6/2003 | Demay et al. .......... | 73/147 |
| 2004/0132551 | A1 * | 7/2004 | Aoyama et al. ........ | 473/378 |
| 2004/0253107 | A1 * | 12/2004 | Page et al. ............. | 416/98 |
| 2004/0262489 | A1 * | 12/2004 | Joseph et al. .......... | 248/646 |

OTHER PUBLICATIONS

"Engineers Discover Secrets of Soccer Free Kicks," by M.J. Carre, press release dated May 20, 2002 from Fluent.com website, www.fluent.com/about/news/pr/pr43.htm.*

"The aerodynamics of a tennis ball," by R.D. Mehta and J.M. Pallis, Sports Engineering vol. 4, pp. 177-189.*

"Golf Ball Aerodynamics," by P.W. Bearman and J.K. Harvey, Aeronautical Quarterly, 27 (1976) pp. 112-122.*

"Wind-Tunnel Measurements of the Aerodynamic Loads on an American Football," by W.J. Rae and R.J. Streit, 2002 Blackwell Science, Ltd., Sports Engineering (2002), pp. 165-172.

"Flight Dynamics of an American Football in a Forward Pass," by William J. Rae, 2003 ISEA, Sports Engineering (2003), pp. 149-162.

"The Curve Kick of a Football II: Flight Through the Air," by M.J. Carre, T. Asai, T. Akatsuka and S.J. Haake, 2002 Blackwell Science, Ltd., Sports Engineering (2002) 5, pp. 193-200.

"Engineers Discover Secrets of Soccer Free Kicks," by M.J. Carre, press release dated May 20, 2002 from Fluent.com website, www.fluent.com/about/news/pr/pr43.htm (6 pages).

"Sports Ball Aerodynamics: Effects of Velocity, Spin and Surface Foughness," by R.D. Mehta and J.M. Pallis, Materials and Science in Sports, proceedings of TMS Conference, San Diego, CA Apr. 2001, pp. 185-197.

* cited by examiner

*Primary Examiner*—Max Noori
(74) *Attorney, Agent, or Firm*—Banner & Witcoff, Ltd.

(57) ABSTRACT

A testing apparatus is disclosed that is suitable for a game ball, such as a soccer ball, and a variety of other spherical or non-spherical objects. The testing apparatus includes a housing with the configuration of an air foil. A shaft extends through the housing, and a mount for securing the game ball to an end of the shaft. A motor is operatively connected to an opposite end of the shaft and is utilized to rotate the game ball in a wind tunnel. The testing apparatus also includes a sensor, such as a two-axis force balance, that detects various fluid forces upon the game ball, including a drag force and a side force, for example.

12 Claims, 11 Drawing Sheets

TESTING APPARATUS

BACKGROUND OF THE INVENTION

1. Field of the Invention

The present invention relates to testing apparatuses utilized in connection with a wind tunnel. The invention concerns, more particularly, a wind tunnel testing apparatus that is suitable for determining fluid forces on a variety of spherical or non-spherical objects, including a sport ball such as a soccer ball.

2. Description of Background Art

A soccer ball conventionally includes a paneled casing that surrounds an inflatable bladder. The casing is formed from a plurality of durable, wear-resistant panels that are stitched together along abutting edges to form a closed surface. The bladder, located on the interior of the casing, is formed of a material that is substantially impermeable to air and includes a valved opening, accessible through the casing, to facilitate inflation of the bladder. When inflated, the bladder expands and places a uniform outward pressure on the casing, thereby inducing the casing to take a substantially spherical shape. In addition, a lining may be positioned between the bladder and casing to provide protection for the bladder.

The panels that form the casing of the conventional soccer ball correspond with the various faces of a regular, truncated icosahedron. An icosahedron is a polyhedron having twenty faces. The term regular, when applied to an icosahedron, denotes a configuration wherein each of the twenty faces is an equally-dimensioned, equilateral triangle. A regular icosahedron, therefore, includes twenty equilateral triangular faces and twelve vertices that are formed where points of five triangular faces meet. A regular, truncated icosahedron is a regular icosahedron, as described, wherein each of the twelve vertices are removed, thereby converting the vertices into twelve pentagonal faces and converting each triangular face into a hexagonal face. Accordingly, a regular, truncated icosahedron is a polyhedron having thirty-two faces, twelve of which are equilateral pentagons and twenty of which are equilateral hexagons, and sixty vertices formed where the points of three faces meet.

The conventional soccer ball casing, which is modeled on the regular, truncated icosahedron, includes thirty-two panels composed of twenty equilateral hexagonal panels and twelve equilateral pentagonal panels. The panels are stitched together along abutting edges, the stitches being located on the interior portion of the casing. The internal pressure imparted by the bladder causes each panel of the traditional soccer ball to bow outward, thereby inducing a substantially spherical shape in the soccer ball.

During a soccer match or practice session, the soccer ball is generally manipulated by the feet of an individual in order to advance the soccer ball toward a goal. More specifically, the individual may kick the soccer ball. When kicked, the soccer ball may follow a trajectory that arcs upward, extends along a low, straight path, or curves left or right, for example. One factor that affects the trajectory of the soccer ball is the various physical characteristics of the soccer ball, which include, the depth of the seams between adjacent panels, the surface properties of the panels (e.g., rough, smooth, or dimpled), and the dimensions of the soccer ball, for example. In addition to the physical characteristics of the soccer ball, the spin and velocity imparted to the soccer ball by the individual also affect the trajectory.

As the soccer ball passes through the air, various fluid forces affect the trajectory, including a drag force and a side force. The drag force operates to slow the overall velocity of the soccer ball, thereby impeding forward motion of the soccer ball. The side force, which is orthogonal to the drag force and the spin axis of the soccer ball, causes the soccer ball to follow a curving trajectory or a downward trajectory. The degree of drag force and side force that operate upon the soccer ball to affect the trajectory depend upon the physical characteristics, spin, and velocity of the soccer ball, for example.

The total drag force upon a soccer ball includes two components: frictional drag and parasitic drag. Frictional drag occurs as a result of shear forces that act upon the soccer ball. As the soccer ball passes through the air, various molecules within the air contact the surface of the soccer ball and reduce the overall kinetic energy of the soccer ball through frictional losses. Parasitic drag forms the largest contributor of the total drag force and is a combination of all other forms of drag. For example, parasitic drag includes pressure drag, which reduces the kinetic energy of the soccer ball through differences in pressure between a front area and a rear area of the soccer ball. As the soccer ball moves through the air, a wake is formed behind the soccer ball (i.e., in the rear area of the soccer ball). In comparison with the pressure of the air that extends around the front area of the soccer ball, the pressure within the wake is significantly lower. In effect, therefore, a pressure difference is formed between the front and rear areas of the soccer ball. Given that the pressure in the rear area is less than the pressure in the front area, a rearwardly-directed force (i.e., pressure drag) impedes the motion of the soccer ball through the air.

The degree to which pressure drag affects the trajectory of the soccer ball depends, in part, upon the physical characteristics and velocity of the soccer ball. Research indicates that air moving over a perfectly smooth sphere separates (i.e., forms a wake) at a point positioned at approximately 80 degrees from the front area of the ball. Soccer balls, however, are not smooth spheres due to the seams and surface properties of the panels. In effect, the seams cause the air to become turbulent, thereby causing the air moving over the soccer ball to form a wake at a point that is positioned as much as 120 degrees from the front area of the ball. The initial velocity of the soccer ball also has an effect upon the drag force. In general, the drag force is proportional to the velocity of the soccer ball such that a greater velocity imparts greater drag forces. Accordingly, the physical characteristics and velocity of the soccer ball have an effect upon the trajectory of the soccer ball.

The side force also affects the trajectory of the soccer ball by causing the soccer ball to follow a curving trajectory or a downward trajectory, for example. The side force is orthogonal to both the drag force and the spin axis of the soccer ball. At relatively low angular velocities, the air follows the rotation of the soccer ball due to viscous, non-slip conditions at the surface of the soccer ball. When the soccer ball rotates at relatively high angular velocities, however, the air flow on one side of the soccer ball advances with the direction of the rotation, while the air flow on the other side of the soccer ball is impeded by the rotation. The air flowing with the rotation gains energy and exhibits a tendency to adhere to the surface of the soccer ball before separating to form the wake. The air flowing against the rotation, however, exhibits a greater tendency to separate from the surface and form a wake. This difference in separation points induces a pressure differential between the two sides of the soccer ball and results in the side force. As with pressure drag, the seams and surface properties of the panels may affect the degree of turbulence in the air, thereby affecting the side force acting upon the soccer ball.

As discussed above, the fluid forces acting upon the soccer ball depend upon the physical characteristics, spin, and velocity of the soccer ball, thereby affecting the overall trajectory of the soccer ball. The fluid forces include the drag force and the side force. Whereas the drag force operates to slow the overall velocity of the soccer ball, the side force causes the soccer ball to follow a curving trajectory or a downward trajectory.

SUMMARY OF THE INVENTION

The present invention is a testing apparatus for a game ball that may include a support, a mount and a sensor, for example. The support has a leading edge and a trailing edge, and the support is tapered between the leading edge and the trailing edge. The support also defines a longitudinal axis that extends through a first end and a second end of the support. The mount is located proximal the first end of the support and is configured to secure to the game ball. The mount is also rotatable about the longitudinal axis. The sensor detects forces upon the game ball in a first direction and a second direction. The first direction corresponds with a direction between the leading edge and the trailing edge, and the second direction is orthogonal to both the first direction and the longitudinal axis.

In another aspect of the invention, the testing apparatus may include a rotating element, a mount, an airfoil, and a sensor. The rotating element includes a first end, a second end, and a longitudinal axis that extends through the first end and the second end. The mount is located proximal the first end of the rotating element and is configured to secure to the game ball, and the mount is rotatable with the rotating element about the longitudinal axis. The airfoil extends around the rotating element and has a leading edge and a trailing edge. The sensor detects forces upon the game ball in a first direction and a second direction. The first direction corresponds with a direction between the leading edge and the trailing edge, and the second direction is orthogonal to both the first direction and the longitudinal axis.

A further aspect of the invention involves a method of determining fluid properties of a game ball. The method may involve steps of rotating, inducing, and sensing. More particularly, the method involves rotating the game ball about an axis. Fluid flow is induced around the game ball in a first direction that is orthogonal to the axis. Forces upon the game ball are also sensed in the first direction and a second direction, the second direction being orthogonal to both the first direction and the axis.

In yet another aspect of the invention, a game ball is manufactured through steps that may include rotating a first test ball about an axis; inducing fluid flow around the first test ball; sensing forces upon the first test ball due to the fluid flow; collecting a first set of data relating to the forces upon the first test ball; rotating a second test ball about the axis; inducing fluid flow around the second test ball; sensing forces upon the second test ball due to the fluid flow; collecting a second set of data relating to the forces upon the second test ball; and incorporating characteristics from at least one of the first test ball and the second test ball into the game ball based upon an analysis of the first set of data and the second set of data.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

Figure 1:
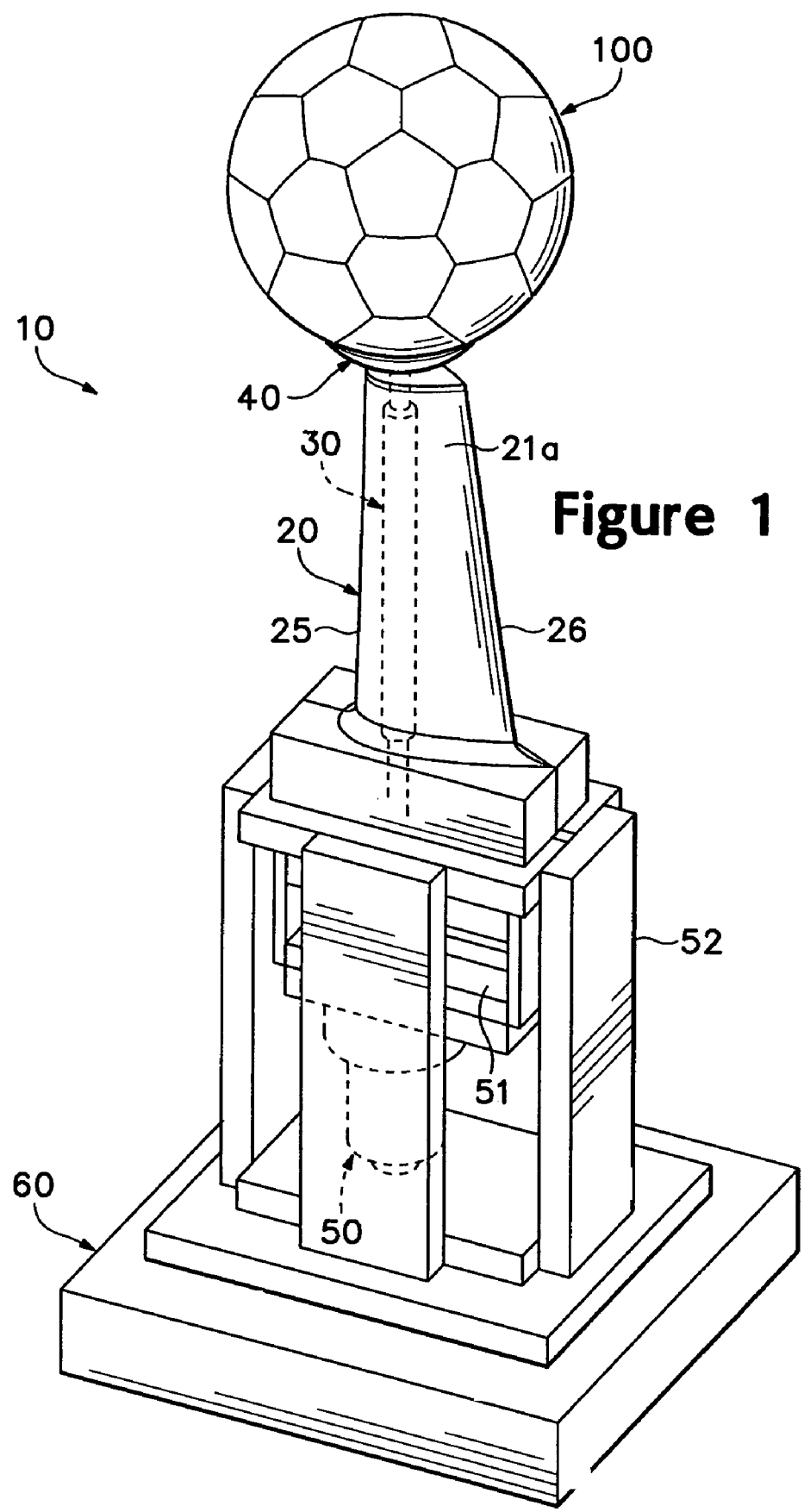
FIG. 1 is a perspective view of a testing apparatus and a test subject that is secured to the testing apparatus.
Figure 2:
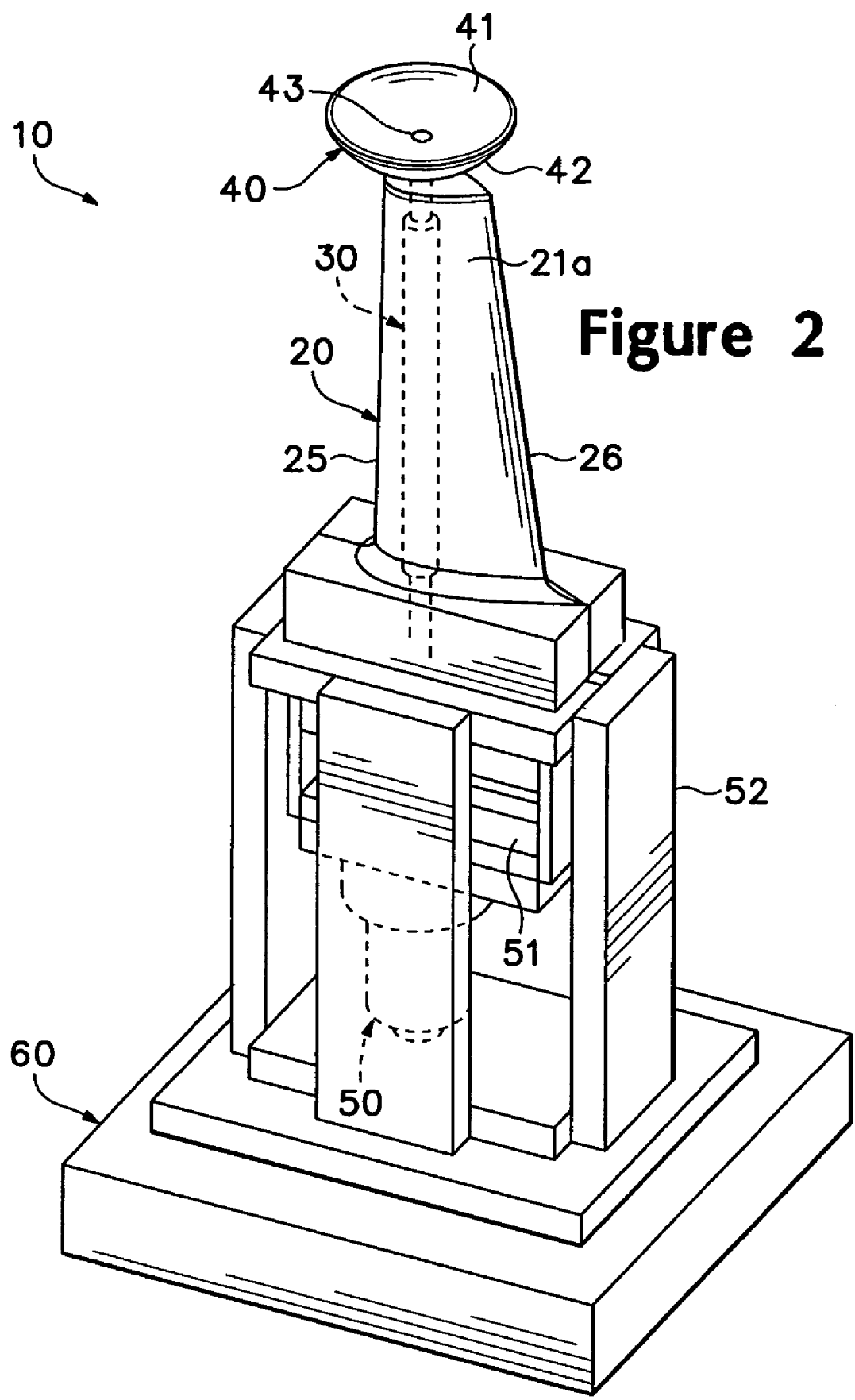
FIG. 2 is a perspective view of the testing apparatus.

The following discussion and accompanying figures disclose a testing apparatus 10 that is suitable for use within a wind tunnel in order to gauge or otherwise determine the fluid forces on a rotating test subject. Referring to FIG. 1, a game ball 100 with the configuration of a soccer ball is disclosed in connection with testing apparatus 10 in order to provide an understanding of the manner in which testing apparatus 10 may be utilized to determine the fluid forces on a test subject. Although game ball 100 is a suitable test subject, testing apparatus 10 may be utilized in conjunction with a variety of spherical or non-spherical objects. Accordingly, testing apparatus 10 may be utilized to determine the fluid forces on a variety of test subjects, in addition to game ball 100.

Game ball 100 may follow a trajectory that arcs upward, extends along a low, straight path, or curves left or right, for example, when kicked or thrown during a practice session or competition. As discussed generally in the Background of the Invention section above, the trajectory of game ball 100 depends upon factors that include the physical characteristics of game ball 100, the spin imparted to game ball 100, and the velocity of game ball 100. With regard to the physical characteristics of game ball 100, the depth of the seams between adjacent panels, the surface properties of the panels (e.g., rough, smooth, or dimpled), and the dimensions of game ball 100, for example, may affect the resulting trajectory. Testing apparatus 10 may be utilized in combination with a wind tunnel to simulate fluid flow around game ball 100. More particularly, testing apparatus 10 may be utilized to determine the manner in which changes in the physical characteristics of game ball 100 affect the fluid forces. In addition, testing apparatus 10 may be utilized to determine the manner in which the velocity and spin of game ball 100 affect the fluid forces.

Testing apparatus 10 is depicted in FIGS. 2–9 and includes a housing 20, a shaft 30, a mount 40, a motor 50, and a sensor 60. Housing 20 exhibits an airfoil configuration that extends into a wind tunnel during the testing of game ball 100. Shaft 30 extends through housing 20 and is rotatable. A first end portion of shaft 30 is secured to mount 40 such that mount 40 rotates with shaft 30. An opposite second end portion of shaft 30 is operatively connected to motor 50, which induces rotation in shaft 30 and mount 40. The configuration of mount 40 may vary within the scope of the present invention in order to provide a suitable manner of securing the test subject to testing apparatus 10. Due to the generally spherical configuration of game ball 100, mount 40 is depicted as having a concave upper surface with a curvature that is substantially similar to a curvature of game ball 100. Motor 50 may be any device suitable for rotating shaft 30 and mount 40, and motor 50 may include a gear reducer for increasing the angular velocity of shaft 30 and mount 40. Sensor 60 detects various forces upon shaft 30, which translate into the fluid forces upon game ball 100. Accordingly, testing apparatus 10 rotates game ball 100 within a wind tunnel and detects various fluid forces upon game ball 100 due to movement of a fluid (i.e., air) within the wind tunnel.

Housing 20 includes a pair of separable housing elements 21a and 21b that cooperatively define a channel 22 for receiving shaft 30. A pair of bearings 23 may be located within channel 22 for guiding or otherwise facilitating the rotational motion of shaft 30, and a tachometer 24 may be present to detect the angular velocity of shaft 30. As will be described in greater detail below, housing 20 exhibits an elongate, airfoil configuration that extends into a wind tunnel during the testing of game ball 100. The elongate configuration of housing 20 ensures that mount 40 and game ball 100 are positioned within a free-stream of the air within the wind tunnel. In addition, the air foil configuration of housing 20 limits fluid forces (i.e., wind resistance) upon housing 20 due to the movement of air flowing within the wind tunnel, and the airfoil configuration minimizes disturbances of the air flowing within the wind tunnel.

Figure 4:
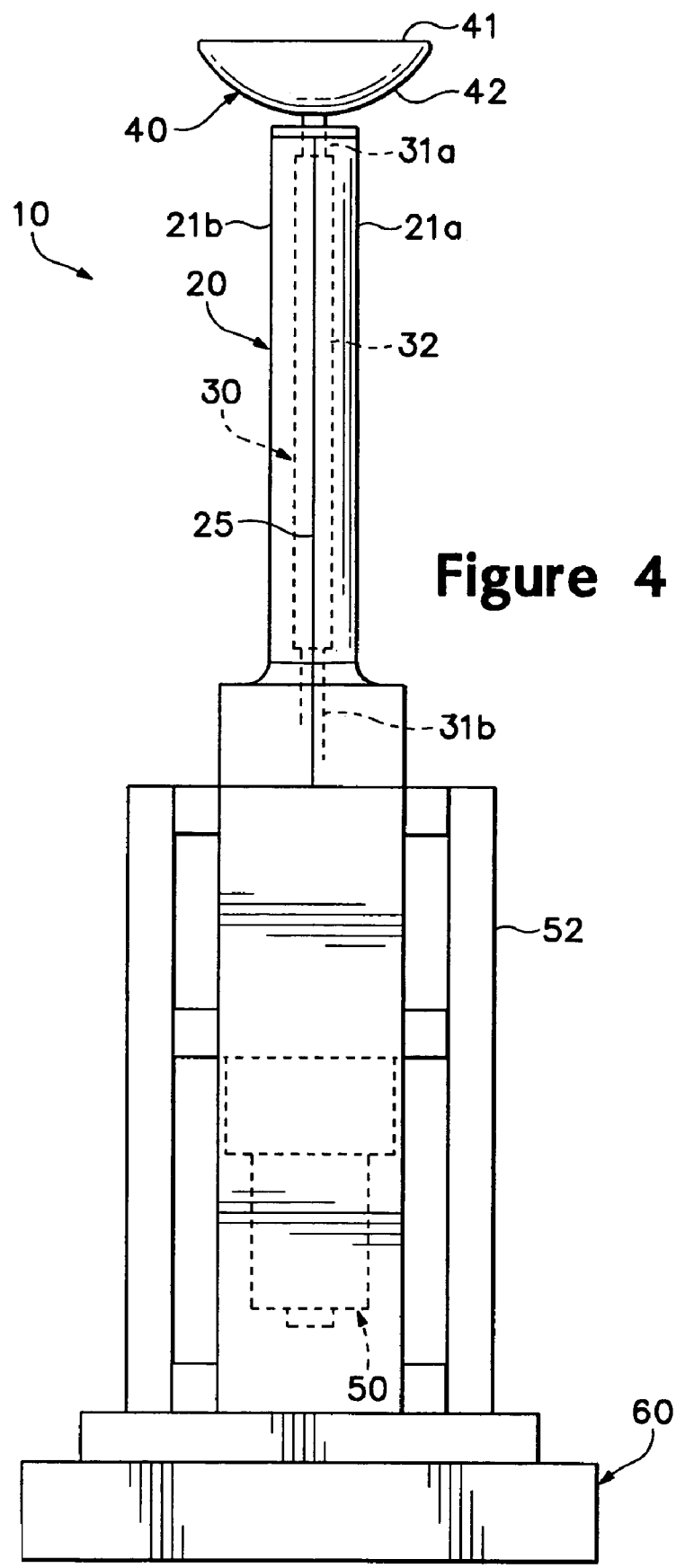
FIG. 4 is a front elevational view of the testing apparatus.
Figure 5:
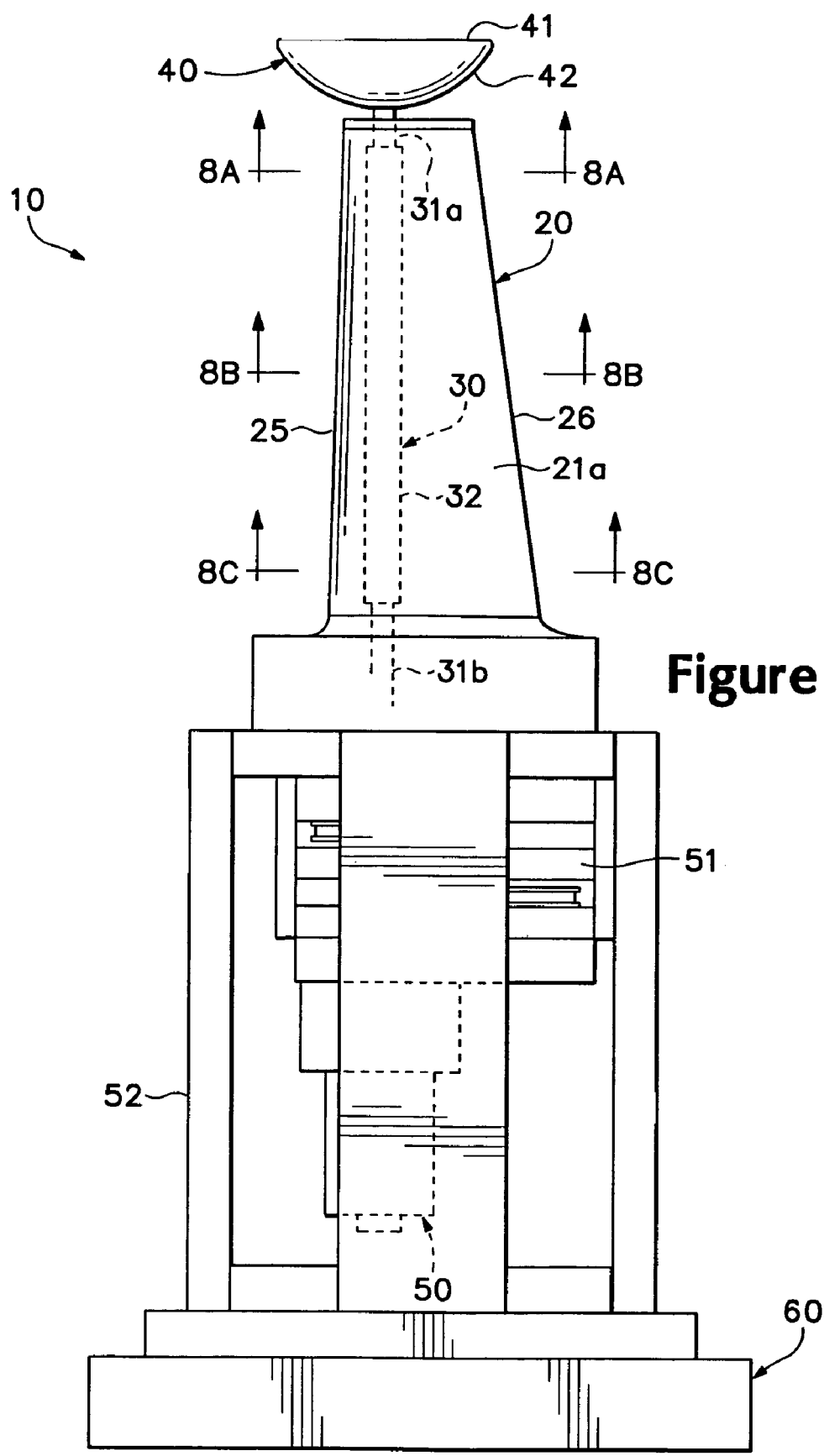
FIG. 5 is a left side elevational view of the testing apparatus.
Figure 6:
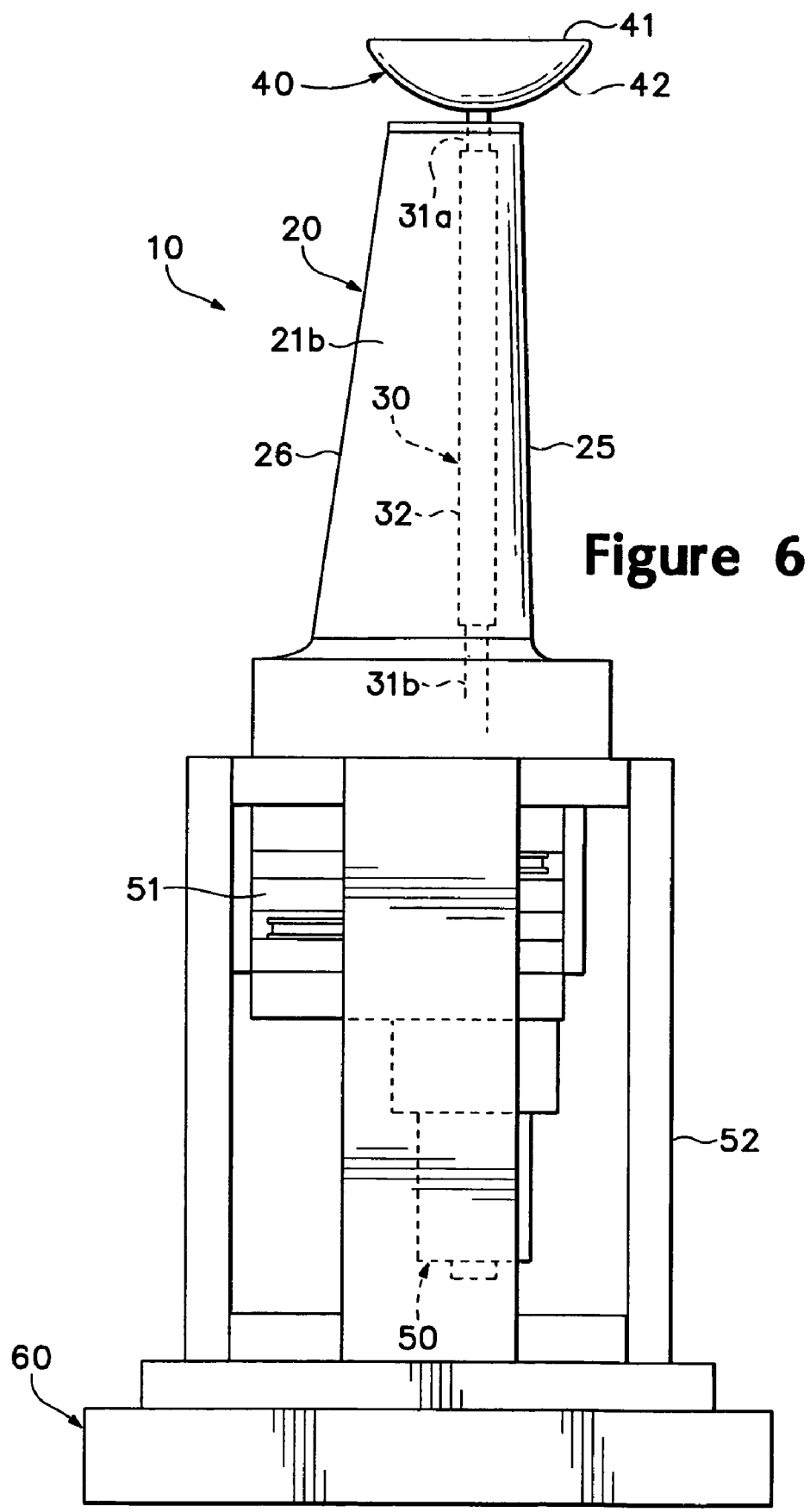
FIG. 6 is a right side elevational view of the testing apparatus.
Figure 7:
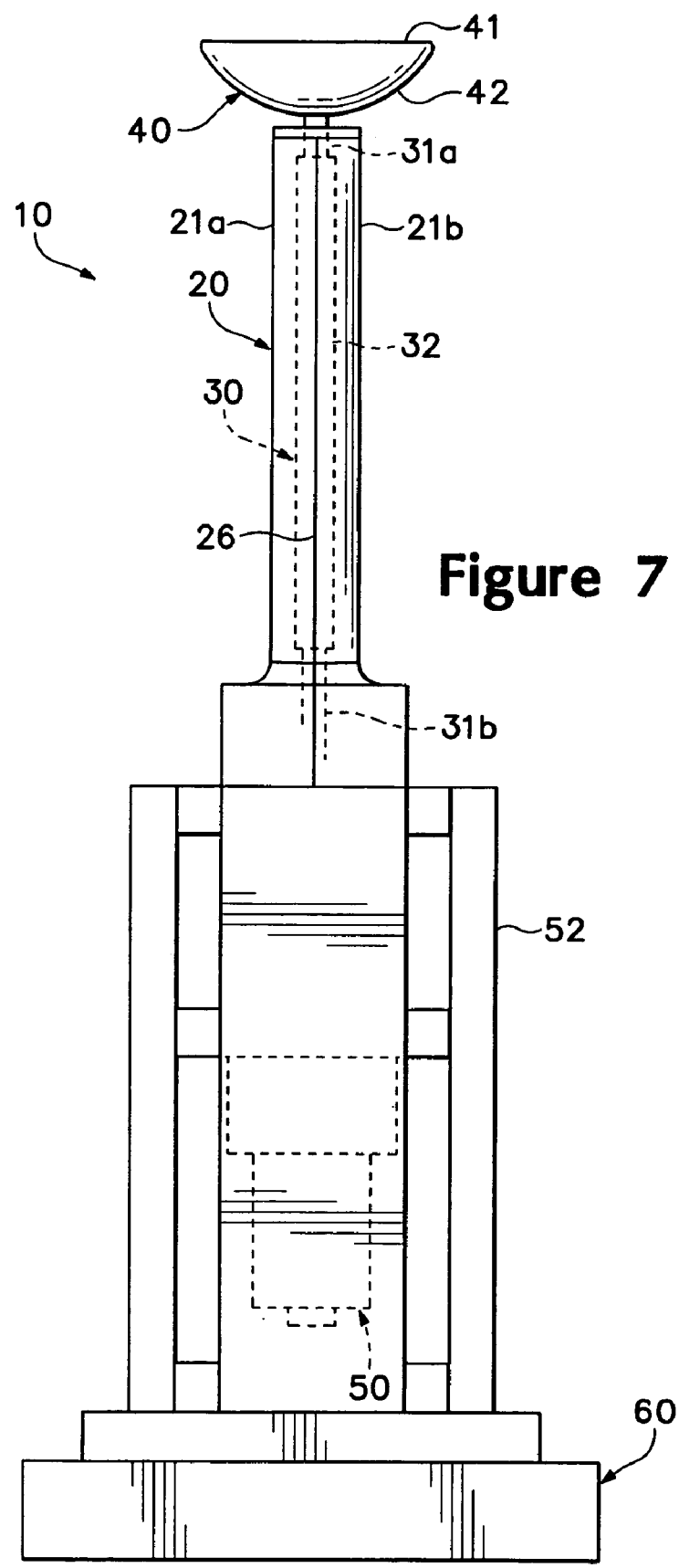
FIG. 7 is a rear elevational view of the testing apparatus.
Figure 8A:
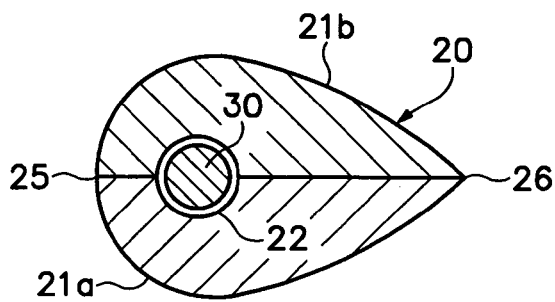
FIG. 8A is a first cross-sectional view of the testing apparatus, as defined by section line 8A—8A in FIG. 5.
Figure 8B:
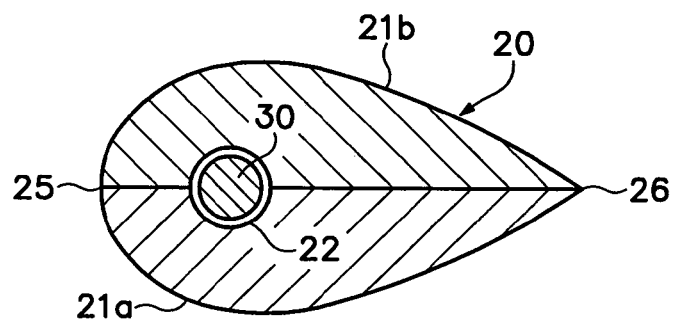
FIG. 8B is a second cross-sectional view of the testing apparatus, as defined by section line 8B—8B in FIG. 5.
Figure 8C:
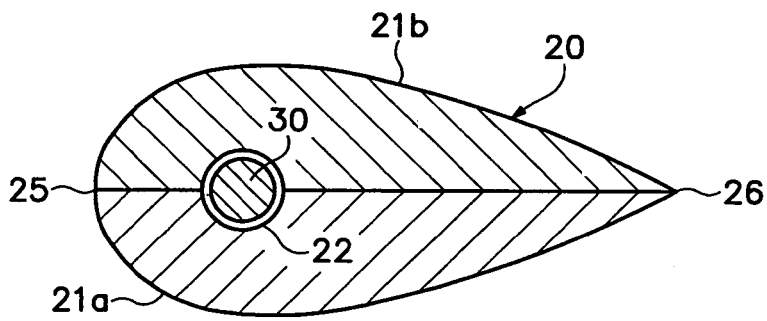
FIG. 8C is a third cross-sectional view of the testing apparatus, as defined by section line 8C—8C in FIG. 5.

The overall shape of housing 20 may vary significantly within the scope of the invention to include any suitable airfoil configuration, including the configuration of a National Advisory Committee on Aeronautics (NACA) 4-digit series airfoil. As depicted in the FIGS. 5 and 6, the airfoil configuration of housing 20 tapers from a lower portion of housing 20 to an upper portion of housing 20. More particularly, a distance between a leading edge 25 of housing 20 and a trailing edge 26 of housing 20 decreases throughout the height of housing 20. In contrast with the distance between leading edge 25 and trailing edge 26, the width of housing 20 is depicted as being relatively constant throughout the height of housing 20, as depicted in FIG. 4. In further embodiments of the invention, however, both the width and the distance between leading edge 25 and trailing edge 26 may taper, or neither may taper. Referring to the cross-sections of FIGS. 8A–8C, the airfoil configuration of housing 20 generally forms the shape of a tear drop that is consistent with an air foil shape. That is, leading edge 25 exhibits a generally rounded shape that tapers to a pointed shape at trailing edge 26. Accordingly, housing 20 may also taper between leading edge 25 and trailing edge 26. In addition, housing 20 is shaped to impart a symmetrical configuration to the air foil, but non-symmetrical airfoil shapes may be utilized in some embodiments.

Housing elements 21a and 21b each form one-half of the elongate, airfoil configuration exhibited by housing 20. Suitable materials for housing elements 21a and 21b include various metal materials, such as aluminum and steel, that have a relatively high density in comparison with other materials. By forming housing elements 21a and 21b from materials of relatively high density, vibrational forces and other disturbances caused by the air flowing within the wind tunnel are minimized. In addition to metals, however, housing elements 21a and 21b may be formed from ceramics or various polymers, for example. Channel 22 extends entirely through housing 20 and portions of channel 22 are formed in each of housing elements 21a and 21b. In general, channel 22 has the shape of shaft 30 and is sized, therefore, to receive shaft 30 and freely permit rotation of shaft 30. Channel 22 may also define cavities for receiving each of bearings 23 and tachometer 24. The position of channel 22 is also selected to correspond with the quarter chord location of the airfoil configuration of housing 20.

Figure 3:
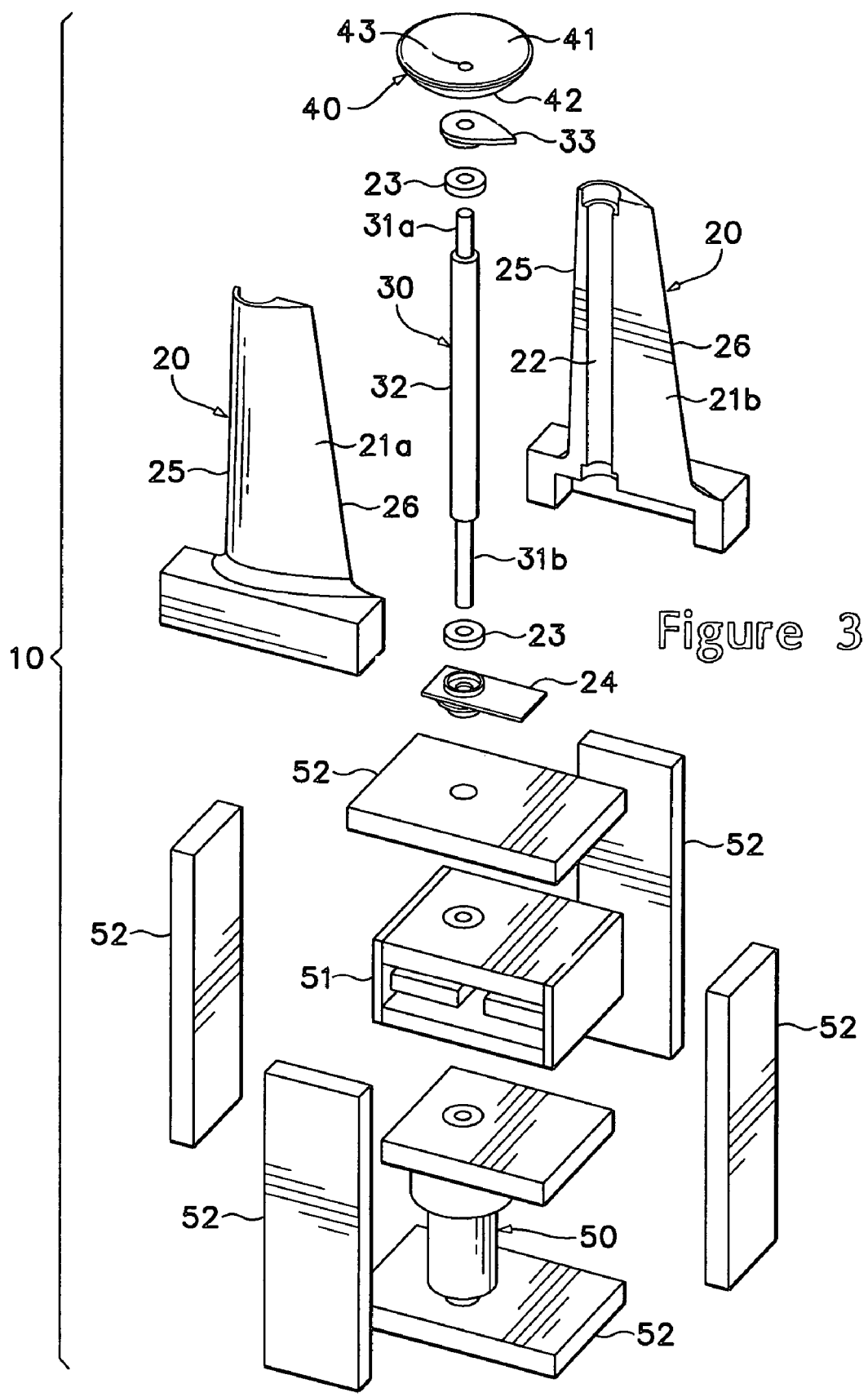
FIG. 3 is an exploded perspective view of the testing apparatus.

Shaft 30 includes an end portion 31a, an opposite end portion 31b, and a central portion 32 that is located between end portions 31a and 31b. Shaft 30 extends through housing 20 and is rotatable with respect to housing 20. More particularly, shaft 30 is positioned within channel 22, and end portions 31a and 31b each extend through one of bearings 23. In some embodiments, each of end portions 31a and 31b may protrude from the upper and lower portions of housing 20. As depicted in FIG. 3, for example, end portions 31a and 31b each exhibit a lesser diameter than central portion 32. End portion 31a includes an insert 33 for joining with mount 40 such that mount 40 rotates with shaft 30. Similarly, end portion 31b is operatively connected to motor 50, which induces rotation in shaft 30 and mount 40. One of end portions 31a and 31b may also extend through tachometer 24. Suitable materials for shaft 30 include a variety of metal materials, such as aluminum and steel, that are capable of withstanding torsional forces during the operation of testing apparatus 10. In addition to metal materials, shaft 30 may be formed from a polymer material or a composite material (i.e., a fiber-impregnated polymer), for example.

Shaft 30 and housing 20 cooperatively form a support for game ball 100. As will be discussed in greater detail below, housing 20 and shaft 30 extend into a wind tunnel and support game ball 100 within the wind tunnel. Channel 22 defines a longitudinal axis of the support, and shaft 30 is positioned to coincide with the longitudinal axis. Accordingly, shaft 30 rotates about the longitudinal axis.

Figure 9:
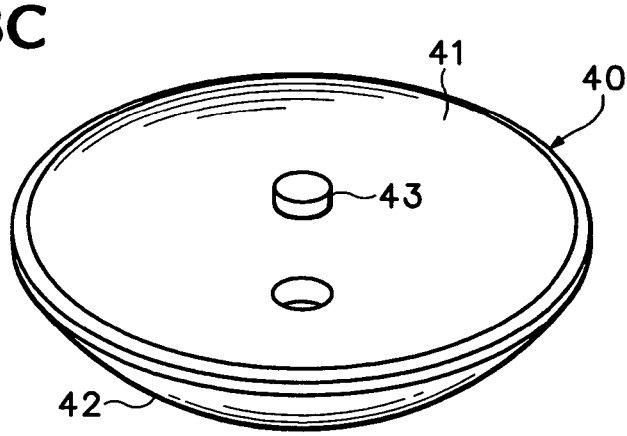
FIG. 9 is an exploded perspective view of a mount portion of the testing apparatus.

Mount 40 is depicted individually in FIG. 9 and includes an upper surface 41 and an opposite lower surface 42, and a plug 43. The purpose of mount 40 is to provide a suitable manner of securing game ball 100 to testing apparatus 10, and the structure of mount 40 may vary significantly within the scope of the invention to achieve this purpose. In general, mount 40 joins with both shaft 30 and game ball 100 to effectively secure game ball 100 to testing apparatus 10. In order to secure mount 40 to shaft 30, a connector secured to end portion 31a may extend through lower surface 42 and engage a cavity within mount 40. Alternately, plug 43 may be removed and a bolt or other fastener that joins with shaft 30 may be placed through an aperture formed by the removal of plug 43.

Due to the generally spherical configuration of game ball 100, upper surface 41 exhibits a concave configuration that corresponds with a curvature of game ball 100. An adhesive may be applied to one or both of upper surface 41 and game ball 100 in order to secure game ball 100 to mount 40. In addition to an adhesive, various vacuum systems or mechanical fasteners may also be utilized to secure game ball 100 to mount 40. Suitable materials for mount 40 include various polymer foams, such as polyurethane or ethylvinylacetate, that are generally lightweight and durable. Various non-foamed polymers or metal materials may also be utilized to form mount 40.

Motor 50 is mounted below housing 20 and may be any device suitable for rotating shaft 30 and mount 40. More particularly, suitable specifications for motor 50 are twelve volts and one-seventh horsepower, with a maximum revolutions per minute of 1750, for example. As depicted in the figures, a gear reducer 51 is positioned between motor 50 and housing 20 in order to increase or decrease the angular velocity of shaft 30 and mount 40. A suitable ratio for reduction in the angular velocity imparted by gear reducer 51 is 30:1. A motor housing 52 may also extend around both of motor 50 and reducer 51 to provide a rigid coupling between housing 20 and sensor 60. Motor 50, in combination with reducer 51, is capable of rotating shaft 30, mount 40, and game ball 100 in excess of 600 revolutions per minute. Depending upon the desired angular velocity of game ball 100, however, the output of motor 50 may vary significantly within the scope of the present invention.

Sensor 60 is secured to a lower portion of motor housing 52 and detects various forces. In general, sensor 60 detects both drag and side forces upon game ball 100. As discussed in the Background of the Invention section, the side force is orthogonal to the drag force. Accordingly, sensor 60 should be selected to detect at least two orthogonal forces, and may be a two-axis force balance that utilizes cylindrical air bushings to de-couple the drag and side forces from all other forces and moments. A load cell of 35 kilograms, for example, may be used on each axis of the force balance and calibrated on a regular basis. Other suitable force balances may also be utilized, such as a conventional six-axis force balance.

Testing apparatus 10 rotates game ball 100 within a wind tunnel and detects various fluid forces upon game ball 100 due to movement of a fluid (i.e., air) within the wind tunnel. In general, motor 50 rotates each of shaft 30, mount 40, and game ball 100. A portion of housing 20 extends around shaft 30 and provides stability to shaft 30. In addition, fluid forces upon testing apparatus 10 are minimized due to the airfoil configuration of housing 20. Sensor 60 detects the fluid forces (i.e., drag forces and side forces) upon game ball 100. Accordingly, testing apparatus 10 provides a system that may be utilized in conjunction with a wind tunnel to evaluate the manner in which fluid flow around game ball 100 induces fluid forces on game ball 100.

Figure 10:
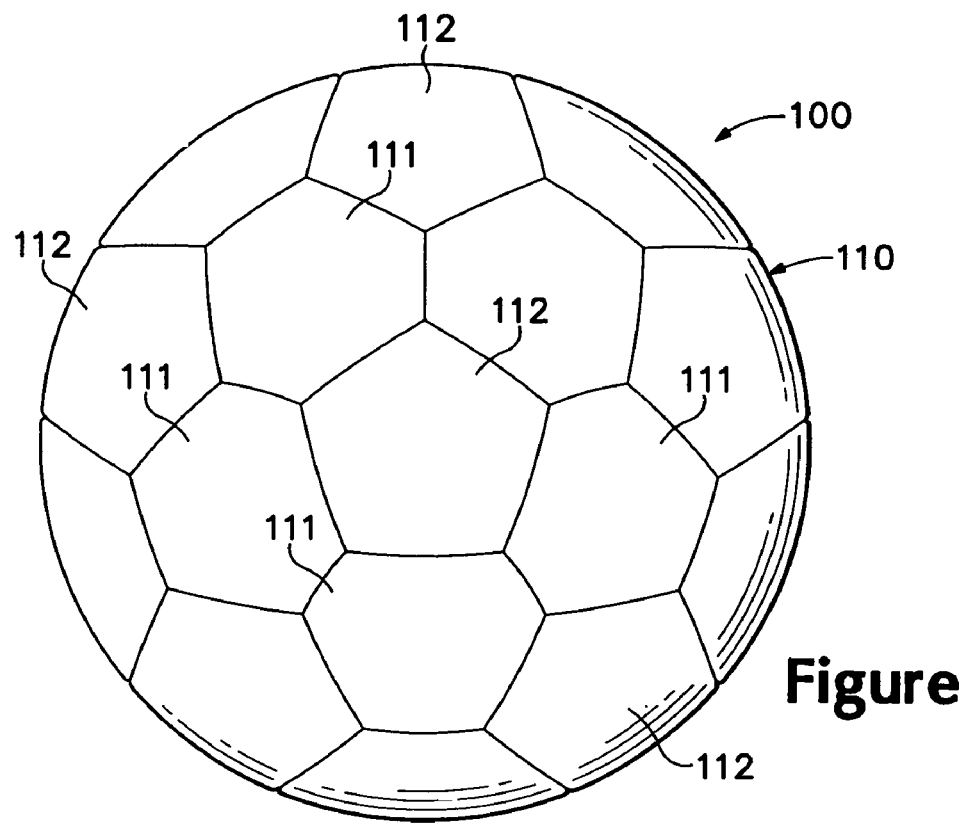
FIG. 10 is a perspective view of the test subject.
Figure 11:
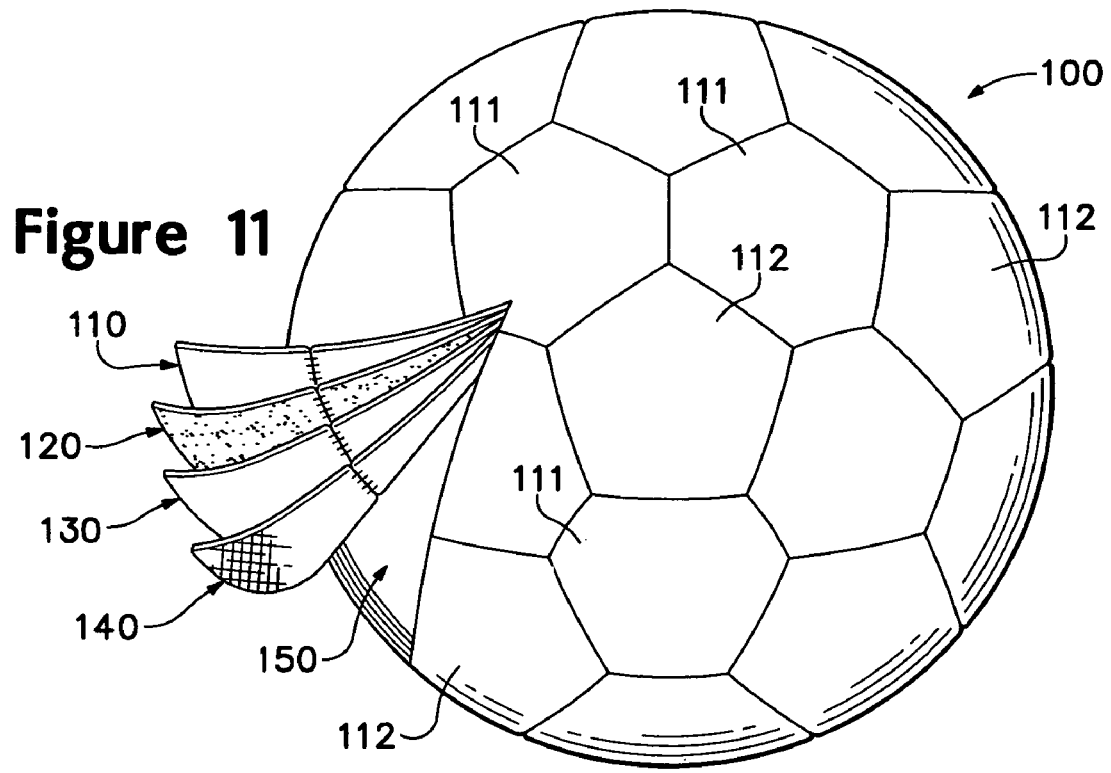
FIG. 11 is a perspective view of the test subject with selected layers peeled away.

Game ball 100, which has the configuration of a soccer ball, is depicted individually in FIGS. 10 and 11. The primary elements of game ball 100 are a cover 110, a foam layer 120, a latex layer 130, a textile layer 140, and a bladder 150. Cover 110 is formed from twenty hexagonal panels 111 and twelve pentagonal panels 112 that are stitched together along abutting sides to form an exterior surface for game ball 100. The various panels 111 and 112 are depicted as having the shapes of equilateral hexagons and pentagons. In further embodiments, panels 111 and 112 may have non-equilateral shapes; selected panels 111 and 112 may be formed integral with adjacent panels 111 and 112 to form bridged panels that reduce the number of seams requiring stitching; or panels 111 and 112 may have other shapes that combine in a tessellation-type manner to form cover 110. The material selected for cover 110 may be leather, polyurethane, polyvinyl chloride, or other suitable materials that are both durable and wear-resistant.

Foam layer 120 is located adjacent to an interior surface of cover 110 and enhances the overall pliability and cushioning of game ball 100. The thickness of foam layer 120 may range from 0.5 millimeters to 4.5 millimeters, for example. Suitable materials for foam layer 120 include a variety of polyolefin polymer foams that include low-density polyethylene, high-density polyethylene, polypropylene, and ethylvinylacetate. The foam material may be processed with chlorofluorocarbon, hydrofluorocarbon, or volatile hydrocarbons as a blowing agent. Alternately, the polyolefin foam may be formed with a chemical blowing agent, such as azodicarbonamide. As a further alternative, the foam forming foam layer 120 may be processed with a nitrogen or other inert gas blowing agent.

In addition to cover 110 and foam layer 120, game ball 100 includes latex layer 130, textile layer 140, and bladder layer 150. Latex layer 130 may be utilized within game ball 100 and is located adjacent to foam layer 120 and opposite cover 110. One purpose of latex layer 130 may be to provide energy return. Textile layer 140 is positioned between latex layer 130 and bladder 150, and textile layer 140 may be formed of natural cotton textiles, polyester textiles, or textiles that incorporate both cotton and polyester fibers, for example. Bladder 150 is the inner-most layer of game ball 100. The material forming bladder 150 is substantially impermeable to air, and may include natural rubber, butyl rubber, or polyurethane. Bladder 150 may incorporate a valved opening (not depicted) that extends through textile layer 140, latex layer 130, foam layer 120, and cover 110 to facilitate the introduction of air. Alternately, the valved opening may be slightly recessed below the level of cover 110. When inflated with a gas to a proper pressure, bladder 150 expands to place an outward force upon cover 110 and layers 120, 130, and 140, thereby inducing game ball 100 to take a substantially spherical shape.

Figure 12:
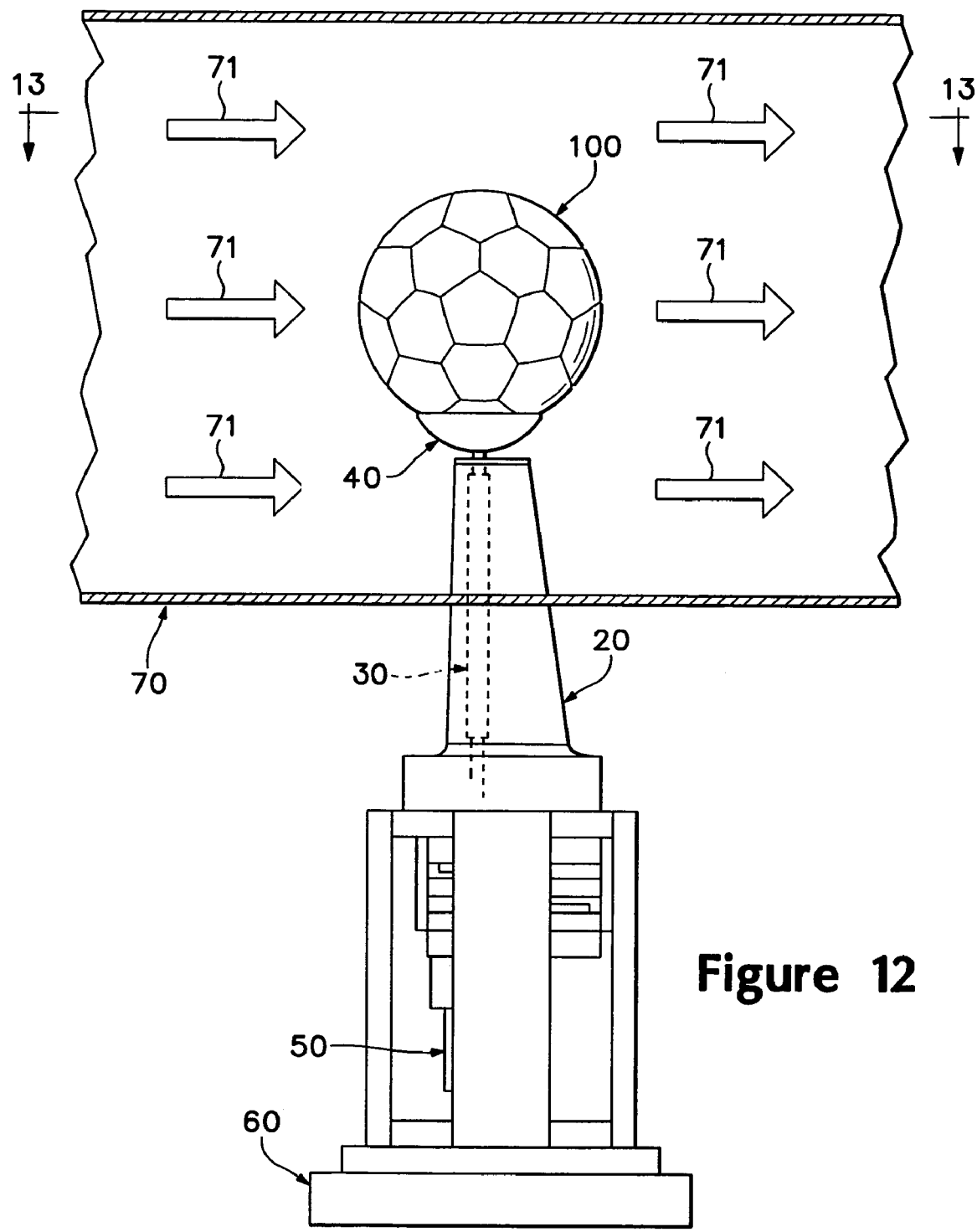
FIG. 12 is a schematic elevational view of the testing apparatus and the test subject within a wind tunnel.

Game ball 100 provides an example of a test subject that may be utilized with testing apparatus 10. In order to determine the fluid forces on game ball 100 due to the moving air, game ball 100 is secured to testing apparatus 10 (i.e., mount 40) and placed within a wind tunnel 70, as depicted in FIG. 12. In general, an upper portion of housing 20 extends through a floor of wind tunnel 70 such that mount 40 and game ball 100 are located in an area of wind tunnel 70 that experiences a free-stream flow of air. A lower portion of housing 20, motor 50, and sensor 60 are positioned outside of the air flow.

Wind tunnel 70 may be capable of generating wind speeds up to approximately 35 meters per second in a 68.6 centimeter by 91.4 centimeter test section. With game ball 100 measuring approximately 21.8 centimeters in diameter, this represents an approximate 6 percent blockage of the test section of wind tunnel 70. Tunnel flow conditioning may be maintained by a system of honeycomb flow straighteners, turbulence screens, corner-flow turning vanes, fan nacelles, and straighteners within wind tunnel 70. A variety of other wind tunnel configurations may also be utilized within the scope of the present invention.

Figure 13:
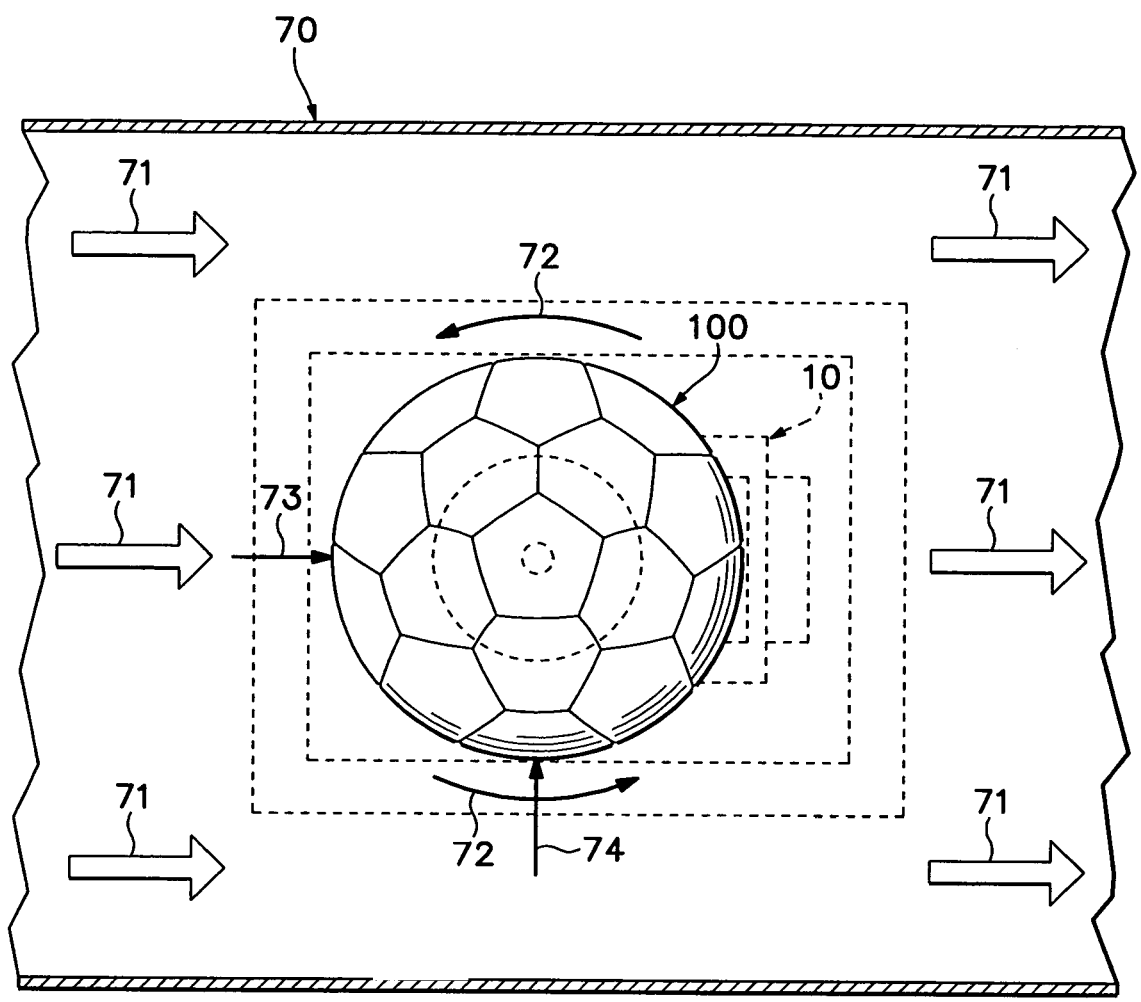
FIG. 13 is a schematic top plan view that depicts fluid forces upon the test subject and movement of the test subject within the wind tunnel, as defined in FIG. 12.

Referring to FIG. 13, a top plan view of game ball 100 and testing apparatus 10 are depicted. The general direction of fluid flow within wind tunnel 70 is represented by a plurality of fluid flow direction arrows 71, and the direction of rotation in game ball 100 is represented by a pair of rotation direction arrows 72. Based upon the orientation of fluid flow direction arrows 71 and the bearing of rotation direction arrows 72, game ball 100 experiences a drag force 73 and a side force 74. Drag force 73 is analogous to air flow around game ball 100 that operates to slow the overall velocity of game ball 100, thereby impeding forward motion of game ball 100. Accordingly, drag force 73 is oriented in the same direction as fluid flow direction arrows 71. Side force 74 arises due to the rotation of game ball 100 and is orthogonal to both drag force 73 and the spin axis of game ball 100. Accordingly, side force 74 is oriented to correspond with a side of game ball 100, whereas drag force 73 is oriented to correspond with a front area of game ball 100.

Based upon the above discussion, testing apparatus 10 may be utilized to determine the fluid properties of game ball 100. More particularly, testing apparatus 10 may be utilized to determine the manner in which the physical characteristics, air flow velocity, and spin rate affect drag force 73 and side force 74. The physical properties of game ball 100 include, for example, the depth of the seams between adjacent panels 111 and 112, the surface properties of panels 111 and 112 (e.g., rough, smooth, or dimpled), and the dimensions of game ball 100. In general, the method may include rotating game ball 100 in the direction of rotation directions arrows 72, thereby rotating game ball 100 about an axis that corresponds with the longitudinal axis of shaft 30. Fluid flow is then induced around game ball 100 and in the direction of fluid flow direction arrows 71. In effect, therefore, the fluid flow is orthogonal to the longitudinal axis. Once game ball 100 is rotating at a desired angular velocity and the fluid flow is at a proper velocity, drag force 73 and side force 74 are detected by sensor 60. Accordingly, sensor 60 will detect forces upon game ball 100 due to the fluid flow.

Merely testing a single test subject, such as game ball 100, may provide data as to the manner in which the fluid flow affects the trajectory of the test subject. Testing multiple test subjects, however, may be utilized to determine the manner in which different physical characteristics of the test subjects, velocities, and spin rates affect drag force 73 and side force 74. Accordingly, the general method discussed above may be utilized on a plurality of test subjects having the general configuration of game ball 100. The different test subjects may be substantially similar to each other, except for differences in one or more physical characteristics. For example, one test subject may exhibit a smooth casing, whereas another test subject exhibits a textured casing. Once the testing of each test subject is complete, the data from the various tests may be analyzed to determine the manner in which changes in the physical characteristics, velocity, and spin rate affect the forces upon the test subjects. Characteristics from at least one of the test balls may then be incorporated into game ball 100 based upon the data analysis. Accordingly, this general method may be utilized to select characteristics of game ball 100 and determine the manner of manufacturing game ball 100.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A testing apparatus for a game ball, the testing apparatus comprising:
    a rotating element with a first end, a second end, and a longitudinal axis that extends through the first end and the second end, the rotating element being rotatable about the longitudinal axis;
    a mount located proximal the first end of the rotating element and configured to secure to the game ball, the mount being rotatable with the rotating element about the longitudinal axis;
    an airfoil extending around the rotating element, the airfoil having a rounded leading edge and a tapered trailing edge; and
    a sensor that detects forces upon the game ball in a first direction and a second direction, the first direction corresponding with a direction between the leading edge and the trailing edge, and the second direction being orthogonal to both the first direction and the longitudinal axis.

2. The testing apparatus recited in claim 1, wherein the airfoil has a leading edge and the trailing edge, the airfoil being tapered between the leading edge and the trailing edge.

3. The testing apparatus recited in claim 2, wherein the airfoil is tapered in an area that is between the first end and the second end of the rotating element.

4. The testing apparatus recited in claim 1, wherein the mount is secured to the first end of the rotating element.

5. The testing apparatus recited in claim 1, wherein a tachometer is operatively connected to the rotating element and detects an angular velocity of the rotating element.

6. The testing apparatus recited in claim 1, wherein the testing apparatus further includes a motor that is operatively connected to the rotating element through a gear reducer.

7. The testing apparatus recited in claim 1, wherein the mount has a concave surface with a curvature that is substantially similar to a curvature of the game ball.

8. A testing apparatus for a game ball, the testing apparatus comprising:
    a rotating element with a first end, a second end, and a longitudinal axis that extends through the first end and the second end, the rotating element being rotatable about the longitudinal axis;
    a mount located proximal the first end of the rotating element and configured to secure to the game ball, the mount being rotatable with the rotating element about the longitudinal axis;
    a support extending around the rotating element the support having a rounded leading edge and a tapered trailing edge that define a teardrop shape in the support; and
    a sensor that detects forces upon the game ball in a first direction and a second direction, the first direction corresponding with a direction between the leading edge and the trailing edge, and the second direction being orthogonal to both the first direction and the longitudinal axis.

9. The testing apparatus recited in claim 8, wherein the mount is secured to the first end of the rotating element.

10. The testing apparatus recited in claim 8, wherein a tachometer is operatively connected to the rotating element and detects an angular velocity of the rotating element.

11. The testing apparatus recited in claim 8, wherein the testing apparatus further includes a motor that is operatively connected to the rotating element.

12. The testing apparatus recited in claim 8, wherein the mount has a concave surface with a curvature that is substantially similar to a curvature of the game ball.

* * * * *